Figure 13:
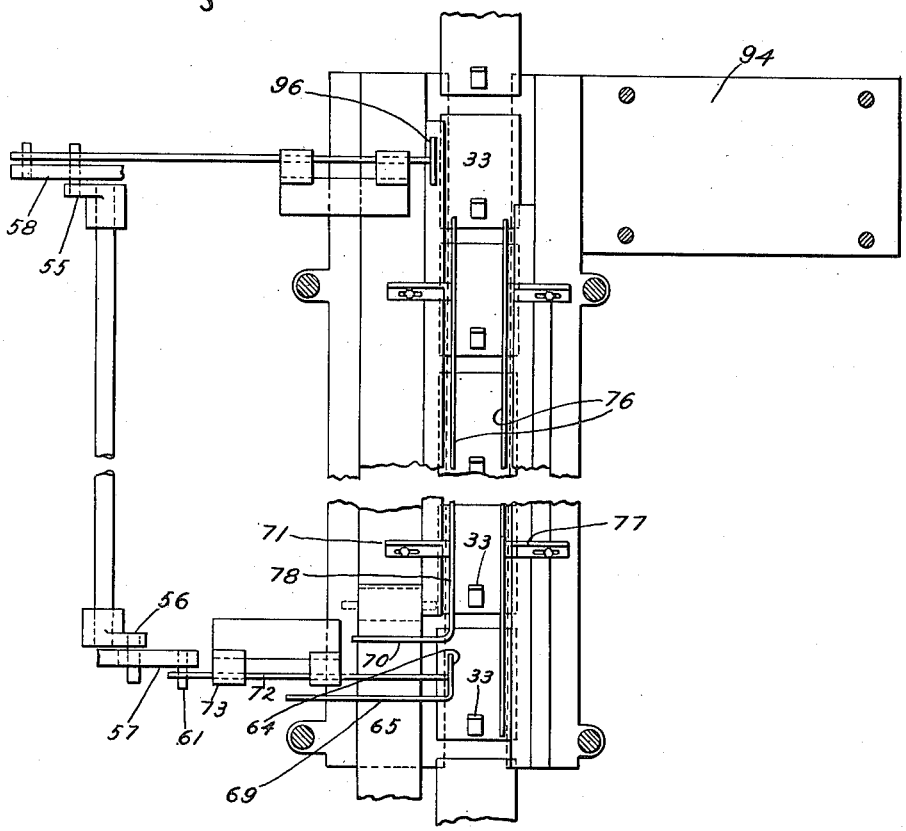

E. G. TREMAINE.
CARTON SEALING MACHINE.
APPLICATION FILED JAN. 15, 1913.
1,141,156.
Patented June 1, 1915.
7 SHEETS—SHEET 1.
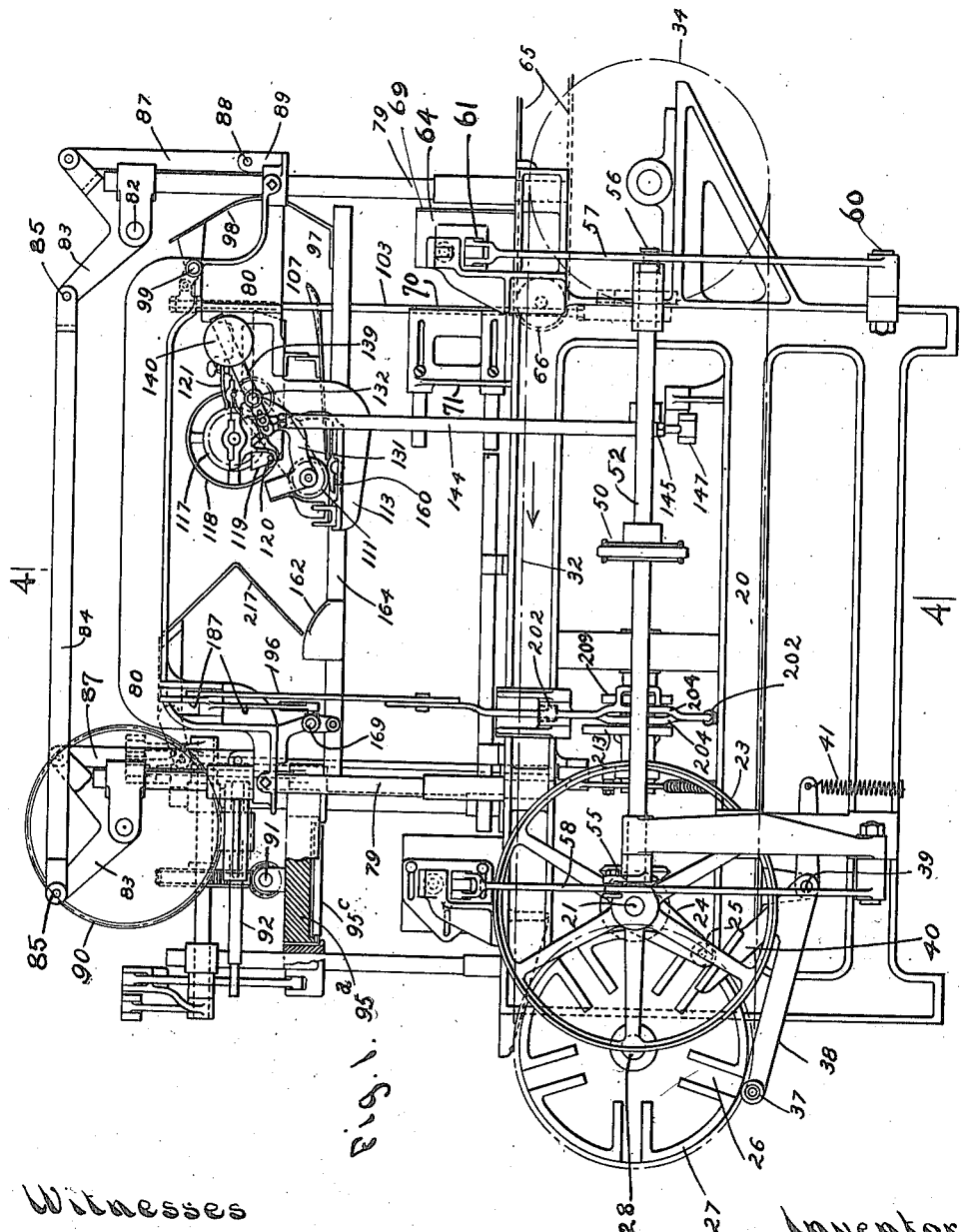
Witnesses
Inventor
E. G. Tremaine,
by Mitchell, Chadwick & Kent,
Att'ys.

E. G. TREMAINE.
CARTON SEALING MACHINE.
APPLICATION FILED JAN. 15, 1913.
1,141,156.
Patented June 1, 1915.
7 SHEETS—SHEET 2.
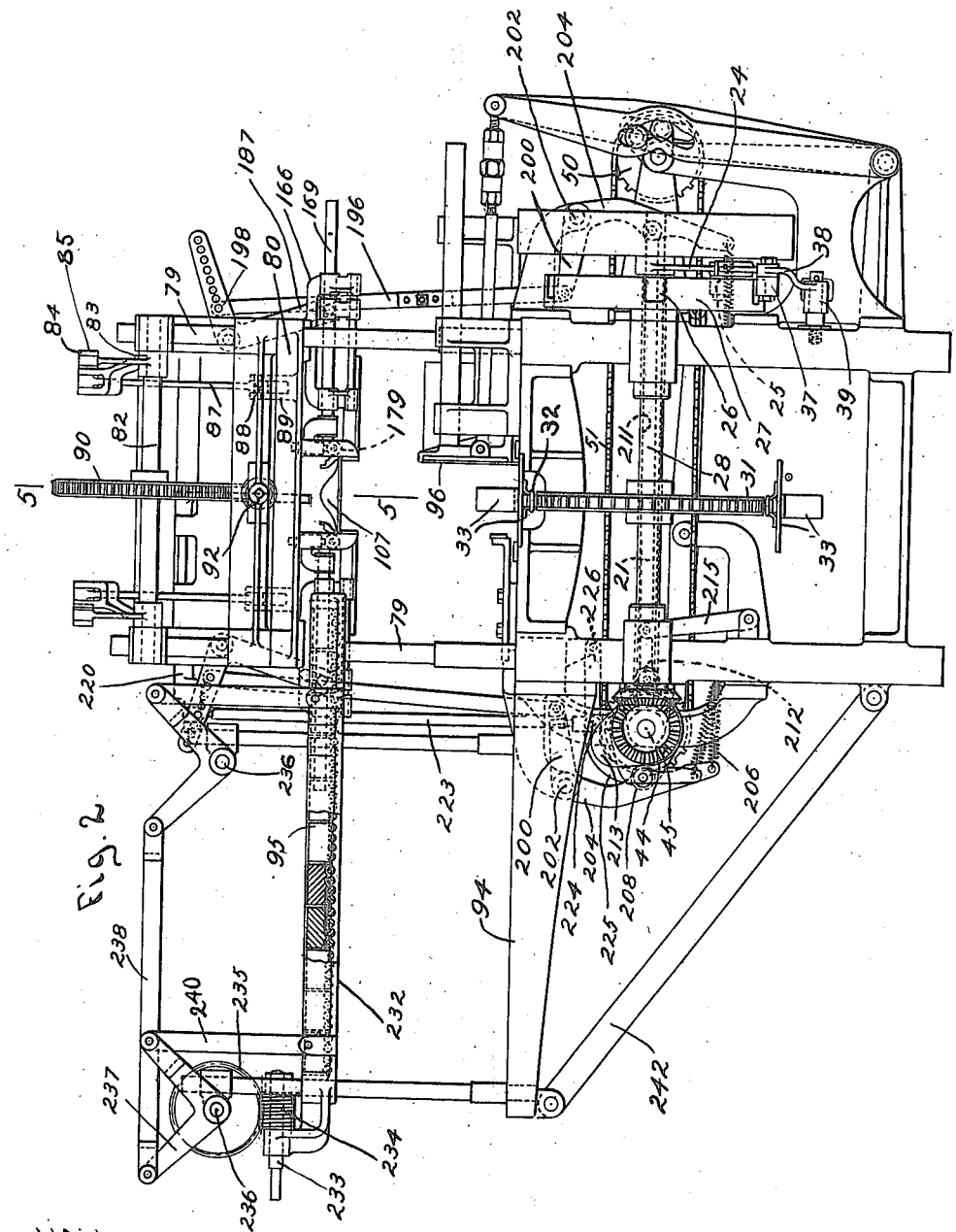
Witnesses
Inventor
E. G. Tremaine,
by Mitchell, Bradnick & Stout
Att'ys.

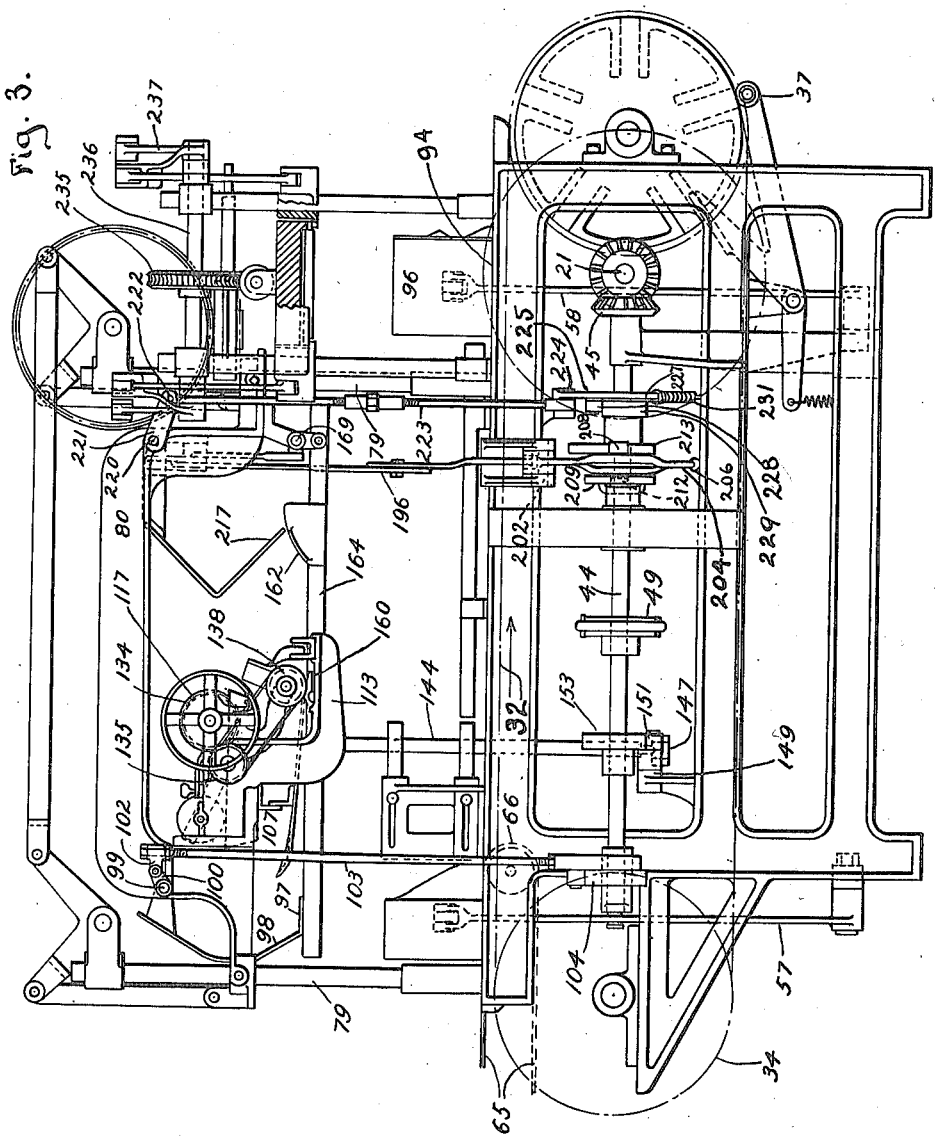

E. G. TREMAINE.
CARTON SEALING MACHINE.
APPLICATION FILED JAN. 15, 1913.
1,141,156.
Patented June 1, 1915.
7 SHEETS—SHEET 4.
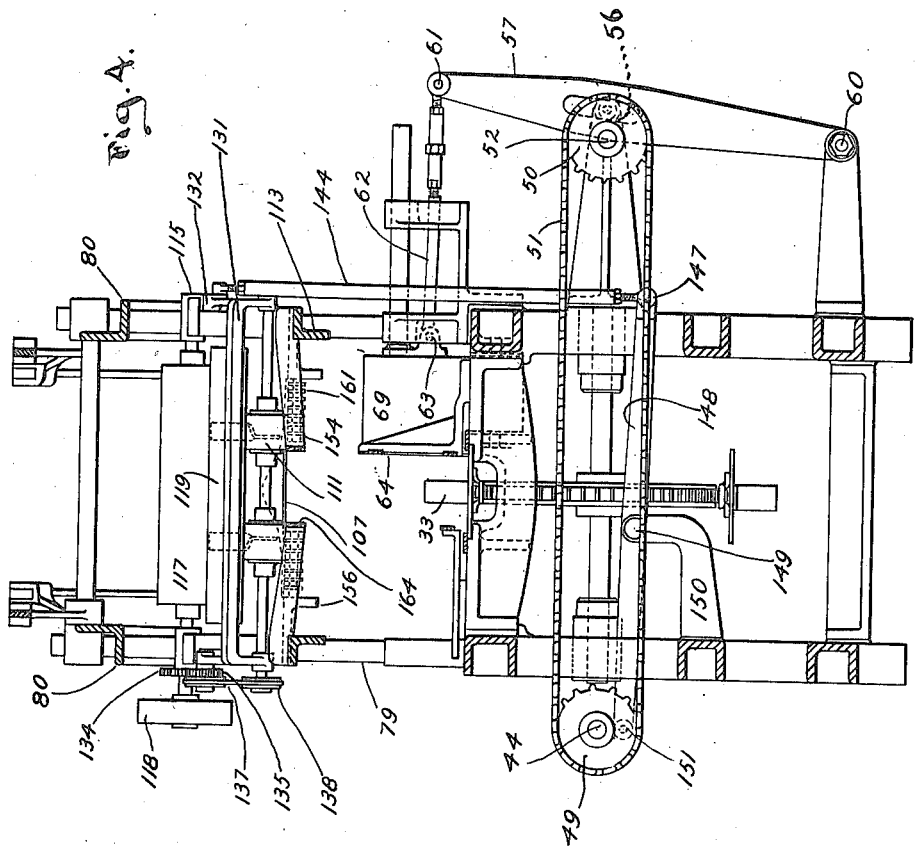

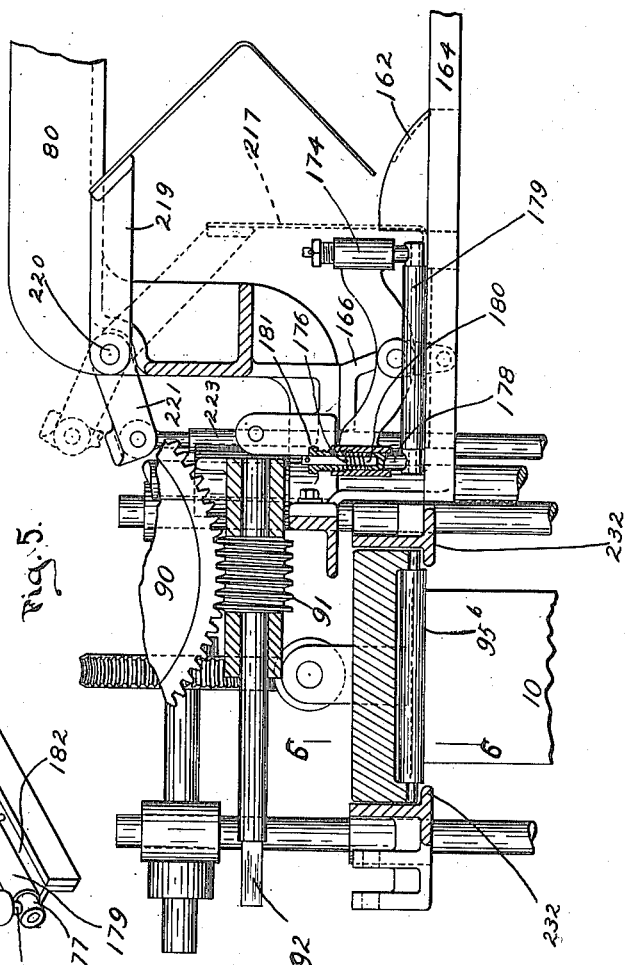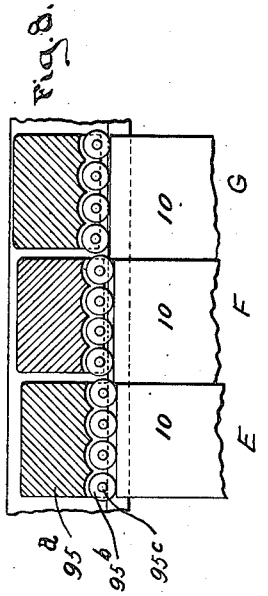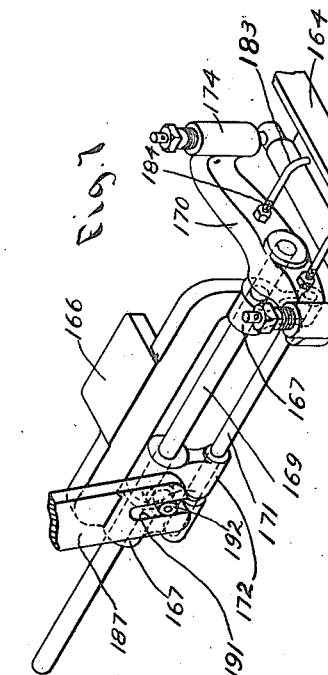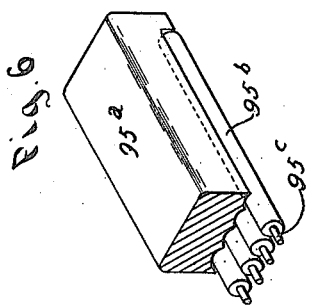

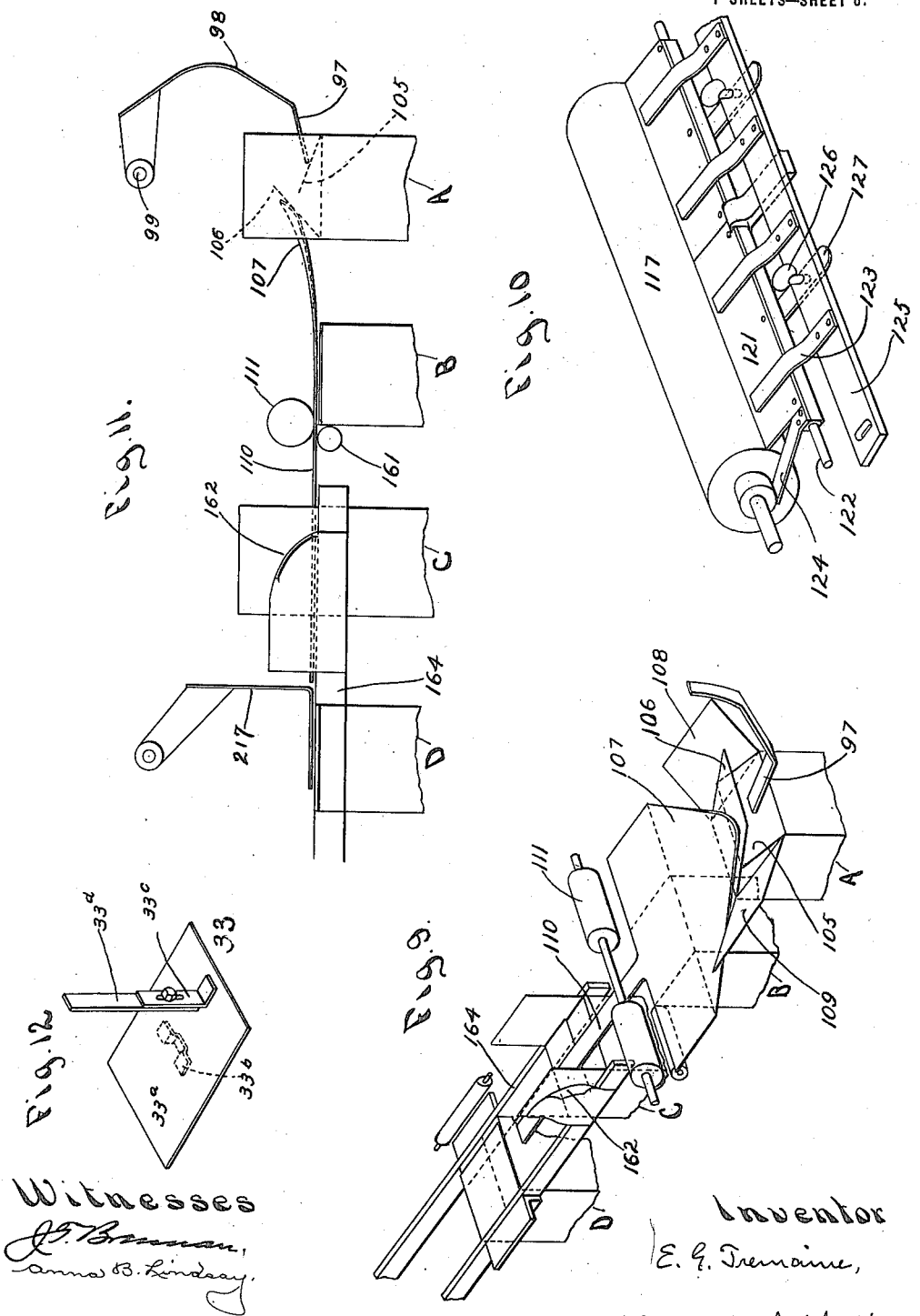

E. G. TREMAINE.
CARTON SEALING MACHINE.
APPLICATION FILED JAN. 15, 1913.

1,141,156.

Patented June 1, 1915.
7 SHEETS—SHEET 7.

UNITED STATES PATENT OFFICE.

EDWARD G. TREMAINE, OF NEWARK, NEW JERSEY, ASSIGNOR TO AUTOMATIC WEIGHING MACHINE COMPANY, OF NEWARK, NEW JERSEY, A CORPORATION OF NEW YORK.

CARTON-SEALING MACHINE.

1,141,156.   Specification of Letters Patent.   Patented June 1, 1915.

Application filed January 15, 1913. Serial No. 742,095.

*To all whom it may concern:*

Be it known that I, EDWARD G. TREMAINE, a citizen of the United States, residing at Newark, in the county of Essex and State of New Jersey, have invented new and useful Improvements in Carton-Sealing Machines, of which the following is a specification.

This invention relates to improvements in carton sealing machinery.

More particularly it relates to machines for closing and sealing the tops of pasteboard containers.

It is especially suitable for use upon packages that have received their charge by action of automatic filling and weighing appliances; although the nature of contents, the manner of their introduction and the weighing or absence of weighing are really immaterial. In the ordinary operation of automatic filling and weighing machinery a package is filled through its top, which then requires to be covered. For covering a square or rectangular carton four flaps are provided, one at the top of each vertical side of the carton, which the filling machine leaves projecting outward in four directions.

It is the object of the present invention to provide mechanism for turning these flaps over upon the top and sealing them there; and to combine this with appliances for taking the cartons singly and in succession from a source of supply, subjecting them to this operation and then retaining in the machine a number of those that have been sealed so that several at once are held while the glue or other agent used is drying. The problem is complicated by the fact that cartons which are nominally of the same size are found to vary somewhat in practice; that a fairly uniform pressure is required on each during the drying, and that it is most convenient for the cartons to follow a single path entering the machine in line at one place, leaving it in line at another, all being subjected to the action of only a single set of devices regardless of their individual variations of size.
It is a further object to provide a machine adapted to various nominally and actually different sizes not only of width and length but of height.

These objects are accomplished by providing a machine which operates by first folding the front and back pair of flaps down upon the carton, next holding them down and meanwhile extending the side flaps horizontally and applying glue to their upper surfaces; next bending the side flaps successively through the vertical position to a horizontal position where they are closed upon the other flaps, with their glued sides down; and then pressing them downward during the required period of time; all packages meanwhile traveling progressively through the mechanism without waiting in any one place for the glue to set. The last mentioned function is accomplished by making a press of sufficient length to accommodate a number of cartons in line at once, with sections individually adjustable, each section being large enough to operate upon a single carton and only a single one, and the whole group of cartons moving forward step by step from one to another of these individual presses. The latter are automatically adjustable and have receiving throats such that cartons of varying heights can individually force their way in, notwithstanding that the section was last occupied by a shorter or longer carton. With this is coupled means to elevate or depress the entire head of the machine carrying the mechanism that acts on the tops of the packages without disconnecting it from the driving and carton feeding appliances.

It is the object of the patent to cover in the claims whatever is new and useful in the structure disclosed.

An embodiment of the invention is illustrated in the accompanying drawings, in which—

Figure 1 is an elevation of the front side of the machine; Fig. 2 an elevation of the left or delivery end; Fig. 3 an elevation of the rear side; Fig. 4 an elevation in section on line 4—4 of Fig. 1, looking toward the right; Fig. 5 an elevation in section on line 5—5 of Fig. 2, showing some of the upper part of the machine, enlarged; Fig. 6 an isometric drawing of a detail of the press, sectioned on line 6—6 of Fig. 5; Fig. 7 an isometric drawing of certain details which are seen only in part in Fig. 5; Fig. 8 an elevation similar to Fig. 2, showing a detail of the flexible press on a larger scale; Fig. 9 an isometric drawing showing in diagram the steps in closing and sealing the carton tops; Fig. 10 an isometric drawing of the main glue roll, and attached details; Fig. 11 a side elevation showing the same steps as Fig. 9 in closing and sealing the carton tops; Fig. 12 an isometric drawing showing details of one of the carton carriers; Fig. 13 a diagrammatic plan of the carton conveying system, with loading and unloading apparatus; and Fig. 14 a diagrammatic end elevation of the same, viewed from the loading end.

In the drawings, the frame of the machine supporting various operating parts is marked 20. The main shaft 21, driven by pulley 23, operates the mechanism as a whole in such manner that a conveyer 32 (indicated by the dot and dash line in Fig. 1) is automatically loaded (Figs. 1, 4, 13, 14) with cartons, and carries them successively under appliances illustrated in diagram in Figs. 9 and 11, whose operation first closes each rear carton flap (Fig. 1), and then closes the forward flap (Fig. 1), applies gum to the side flaps (Figs. 1, 3, 4, 10), closes the side flaps one upon the other (Figs. 5 and 7), and presses the glued top (Figs. 1, 7). Other mechanism then unloads the cartons singly from the carrier (Figs. 1, 13), transferring them to a flexible press seen at the left of Fig. 1 and shown more in detail in Figs. 6 and 8, where each remains for a continuous and predetermined period, while the glue is setting, and is then discharged from the machine. Throughout its operation the machine has a step-by-step action; and some of the operations occur while the cartons are being advanced from one step to the next, and others while the carton is stationary between its successive advances. The mechanism for adjusting the elevation of these appliances to fit cartons of radically different size is seen essentially at the top of Fig. 1, while that by which the press automatically adjusts itself to small variations between cartons of normally equal height is seen in detail in Figs. 1, 6 and 8.

The mechanism by which the step-by-step action is generated and safeguarded will first be described, followed by description of the other parts of the apparatus in approximately the order mentioned above.

The main driving shaft 21 carries an arm 24, Figs. 1 and 2, having at its end a laterally projecting pin roll 25 which sweeps in a path intersecting the circumference of an escapement wheel or disk 27, set on an axis parallel to that of the arm 24. The path of the roll is adjacent to one face of the disk and is parallel to the plane thereof. The disk has radial slots 26 arranged at equi-distant intervals around its circumference, open at the circumference and extending inward about half way to the center; and this arm and slotted disk are so located with respect to each other that the path of the roll 25, as the roll revolves around the axis 21, may enter the peripheral end of one of these slots 26, (the lower right hand one, in the machine represented, Fig. 1), and then, as it proceeds in its revolution about axis 21, turns the disk around until the roll 25 emerges. As illustrated in the drawing, there are five slots 26 in the complete circumference of the disk 27; and the throw of the arm 24 is such that the path of its roll 25 intersects just one-fifth part of the circumference of disk 27, thus rotating the disk 27 through precisely one-fifth of a complete revolution at each complete revolution of the main driving shaft. Only one side of the slot 26 is used for the purpose described, viz., that which is above the roll 25, and a mere succession of abutments on the face of the disk 27 would be sufficient for the purpose described, without making a slot; but both walls of the slots in which the roll 25 engages are utilized in another part of the revolution of disk 27 as part of a locking device which holds the disk positively against movement in either direction except during the interval in which the roll 25 is traveling through that portion of its path which intersects the disk 27. This is accomplished by means of a lug 37 which in this instance is also a roller, and which is likewise adapted to engage in the slots 26. It is carried on the end of an oscillating arm 38 that is pivoted at 39 and has a branch 40 adapted to be engaged and depressed by the roller 25 whenever the latter is about to enter one of the slots 26. When not thus controlled by the roller 25 the arm 28 is controlled by a spring 41 which tends to throw the lug 37 toward the center of the disk 27. The lug 37 is located in such position that the peripheral opening of one of the slots 26 is opposite it, whenever the roller 25 emerges from another one of those slots at the end of its intersecting path. The result is that at that instant the spring 41 throws the lug 37 into such slot 26, where it, in conjunction with its arm 38, acts as a latch to lock the disk against rotation in either direction, the lug 37 bearing against the abutment on either side of the slot 26 in the case of any tendency of the disk to move; and the parts remain locked in this position until the roll 25, having gone around its circuit and being again about to intersect the disk 27, approaches the peripheral end of another of the slots 26. As the branch arm 40 projects into the path of roll 25 when the lug 37 occupies its locking position, the roll 25 engages the branch arm 40 and gradually depresses it, until, at the moment when the roll 25 enters its slot 26, the arm 40 is depressed so far that the lug 37 has been carried completely out from its slot 26. The disk 27 is therefore free to rotate under influence of the traveling roller 25, which it does until the roll 25 emerges, having rotated the disk precisely one-fifth of a revolution, which brings another slot 26 opposite lug 37 for locking the disk.

The disk 27 is on a shaft 28 (Fig. 2), which carries a sprocket wheel 31 that drives a chain 32 having carton carriers 33. The chain passes around an idler sprocket wheel 34, best seen in Fig. 1, from the top of which it travels toward the left, in that figure, through the middle of the machine with a step-by-step motion controlled by the movement of disk 27. At each stage of its advance one of the carriers 33 is moved to a position opposite the conveyer-loading mechanism, where a carton ready to be closed and sealed is automatically placed upon it.

Figure 14:
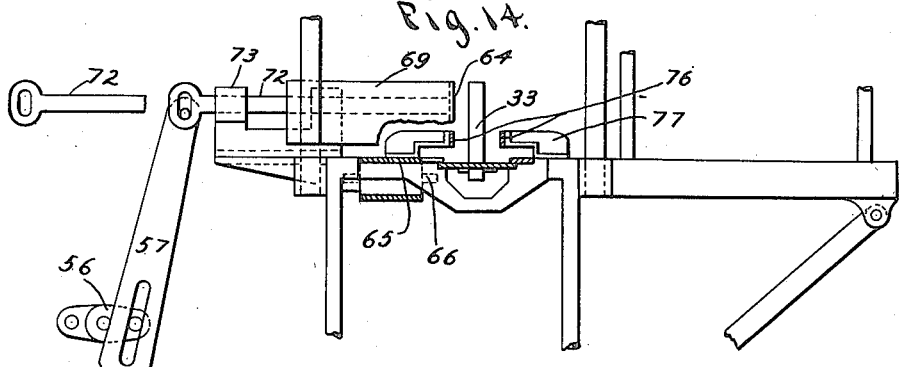

The loading mechanism is controlled by a shaft 44 (Figs. 2, 3), driven by the constantly rotating shaft 21 through beveled gears 45. A sprocket 49 on this shaft, connected with sprocket 50 on the other side of the machine by means of the horizontally extending chain 51 (Fig. 4), drives the parallel shaft 52 which has crank arms 55, 56. The upright lever 57, oscillated by crank 56, operates the mechanism for loading the conveyer, and the lever 58, oscillated by crank 55, that for unloading it. The loading mechanism is seen in Figs. 4, 13 and 14, where the lever 57 to which the crank 56 imparts an oscillating movement about its bottom pivot 60 has a top pivot 61 to which the adjustable connecting rod 62 is attached, its other end being pivoted at 63 to a horizontally moving pusher plate 64. This pusher coöperates with the carton carriers 33 and with a belt 65, Figs. 1, 3 and 14, which brings cartons to the apparatus, passing around a pulley 66. A barrier 69 arranged transversely to the travel of belt 65 and of the carriers 33 is arranged on the pusher 64 (Figs. 4, 13 and 14) on the side where the cartons are approaching, so that cartons brought to this point by the delivery belt are stopped by this barrier until the pusher has been withdrawn to the left, Fig. 14, after which such carton can proceed on belt 65 until it reaches an adjustable stop 70, seen best in Fig. 13, mounted on a suitable support 71 which is seen also in Fig. 1. This plate 70 is to be so adjusted according to the size of the cartons on which the machine is working, as to allow one carton at a time to come in front of the pusher 64 and be subjected to its action when the pusher moves transversely. At the proper time in the cycle of operations the pusher is actuated by the means above described and pushes the package laterally from the position to which it has been brought by belt 65, resting against the stop 70, to a position on the adjacent carton carrier 33 which is preferably at rest at that particular moment. The movement of the pusher in a straight line is insured by any suitable means, the means here illustrated being guide bar 72 sliding in bearings 73.

The carton carriers are designated by the reference numeral 33 which applies to the carrier as a whole, and may preferably be made as shown in detail in Fig. 12, these details being omitted elsewhere. A base or flat plate 33$^a$ is fastened to one of the links of the carrier shown at 33$^b$. Said plate carries an upright 33$^c$ having an extensible member 33$^d$ in front of which the carton rests on the plate 33$^a$. The extension enables the upright to be so adjusted that its top is close to the top of the carton, thus applying the operative pressure uniformly up and down the body of the carton while subjecting it to the operations to be described, and particularly applying sufficient supporting pressure close to the top of the carton, where the main action is.

The upright portions of the carriers are rather narrow, and travel between rails 76, seen in Figs. 13 and 14, which are supported at suitable height above the level of the horizontal carrier plates by brackets 77 and which are adjustable laterally to provide a varying space between these rails according to varying widths of cartons upon which the machine is to operate. Thus, each carton on which the machine is operating is held on its bottom, on each side and behind, and so is firmly seated and supported for the operations that are to be performed on its top. Guides 78 similar to the rails 76 may be attached to the stop plate 70, these being disconnected from the rails 76 in order to allow of endwise adjustment of the stop 70 as described.

The mechanisms for performing the various operations on the tops of the cartons will now be described, the same being supported at an elevation which is readily adjustable to various levels above the level of the carriers 33, so that the various devices which it carries can act upon cartons of any height for which it may be set. The manner of supporting this mechanism, and of changing and holding its level, is as follows: Fixed standards 79 rise from the frame 20 and guide upward and downward a movable upper frame 80 which carries the folding, closing and gluing devices. The standards 79 carry pivots or cross shafts 82 at their tops and bell cranks 83 from which the frame 80 is suspended and by which its elevation is adjusted. These bell cranks are held in the same relation to each other by links 84 pivoted at 85 to one end of each bell crank, the other end of each bell crank having a pivot from which a link 87 depends, the frame 80 being slung pivotally at 88 on the lower ends of these depending links. By these horizontal connections between the bell cranks, viz., the links 84 and the cross shafts 82, all the lower ends of the depending links 87 are maintained at uniform elevation; and by the vertical guides 79, on which the hangers 89 of the frame 80 ride up and down, the movement of the frame 80 is maintained precisely vertical without lateral displacement in any direction. Provision is made for the convenient adjustment of the frame 80 and the devices carried thereby in the vertical direction by connecting each bell crank rigidly to its cross shaft 82 and by fastening on one of those shafts a worm gear 90 (Figs. 1 and 2), which may be rotated by a worm 91 turned by hand by a shaft 92.

Successive operations of the appliances carried on the frame 80 are illustrated diagrammatically in Figs. 9 and 11. Preceding the stage there illustrated it will be understood that the cartons are received at the machine on the conveyer belt 65, the leading carton resting against plate 69 until that with the pusher 64 is out of the way, when it moves forward to the barrier 70 and thence is transferred to the carrier 33. Other cartons succeed it so that when the machine is in operation each of the carriers 33 has a carton, and the various operations now to be described are performed simultaneously upon the cartons, a succession of individual cartons undergoing the various operations at the same time. In these operations the cartons go through the operations illustrated in stages A, B, C and D, in Figs. 9 and 11. The carton which has just been transferred from belt 65 to carrier 33 is in position for the foot 97 to act upon it. This foot is shown in Figs. 9 and 11 in an intermediate stage of its action and in Figs. 1 and 3 as having completed its action. It is at the end of a projection 98 from a cross shaft 99 which also carries an arm 100 pivotally attached to a lug 102 (see Fig. 3), on the end of a vertical connecting rod 103. The lower end of this rod carries a roll bearing on cam 104 fixed on the cam shaft 44, so that periodically the rod 103 is lifted, causing the foot 97 to swing downward to the position illustrated in Figs. 1 and 3. This action folds the rear flap 105 over the carton's top, and presses it down thereon. As the movement of the projection 98 and foot 97 is circular about the shaft 99 as an axis, this will catch every flap 105 even though it be bent to a position rather far back. When the carrier 33 moves the carton forward from position A to position B at the end of this cycle, the forward flap of the carton cover encounters the fixed plate 107 and is thereby depressed, the foot 97 meanwhile remaining at rest. Thus, the flap 105 is held down until the flap 106 has been folded far enough over it to insure both being held down as the carton progresses under plate 107 to the position B of Figs. 11 and 9. The plate 107 is formed with a central projecting nose or edge adapted to engage, fold to closed position and hold there a carton flap 106 of any width, and then to engage the forward edges of the side flaps 108, 109, in the positions which they ordinarily assume in a paste-board carton, as illustrated at A in Fig. 9, and fold them to wide open position and hold them there; so that at position B the carton has its rear and forward covers folded into place and its two side covers extending horizontally outward and held so by the plate 107. The rear and forward flaps continue to be held down by an extension 110 of the plate 107 while the side flaps are coated with glue and folded over upon the rear and forward flaps.

The mechanism illustrated for distributing the glue is as follows: The frame 80 carries brackets 113 (Figs. 1, 4 and 3), having bearings at 115 for the main glue roll 117. This roll may be of any suitable construction and driven by any convenient method, as by a pulley 118, so that it revolves in a glue pan 119, supported removably at 120. It is important to regulate the quantity of glue delivered to the coating rolls in order, on the one hand to prevent the smearing of the cartons and surrounding parts of the machine, and on the other hand to avoid failure of the seal because too little glue has been applied. To meet this situation a scraper or regulating plate 121 (Fig. 10) is hung on a rocker bar 122 having bearings in the brackets 113 and is adjustable with respect to the roll 117 by means of springs 123, 124. The former, 123, project over the scraper from a cross bar 125 and oppose its tilting upward away from the glue roll. Adjusting screws 126 tapped into this bar bear downward against arms 127 which project toward it from rocker bar 122 on the side opposite the scraper. Consequently, by adjusting the screws 126, down on arms 127, the scraper is swung upward away from the glue roll, being held yieldingly by springs 123 in so doing and also the springs 124 which project from the scraper under and against a part of the glue roll shaft are pressed upward against that shaft. The action of this scraper leads to a uniform distribution of glue across the face of the roll; and its adjustment controls the amount which will be delivered to the coating rolls 111. The bearing of the spring arms 123 under the glue roll shaft gives a fixed base or point of departure for the adjustment of the scraper 121 holding it in proper relation to the glue roll. The rolls 111 for coating the carton flaps are adjustable in position transversely of the machine on a shaft which has bearings in a sub-frame 131 mounted by trunnions 132 on the brackets 113, and are driven from the glue roll shaft by gears 134, 135, the latter of which has a pulley face adjoining its toothed face and carries belt 137 that drives a pulley 138 on the shaft supporting the coating rolls 111. Thus the coating rolls are revolved in a direction opposite that of the main glue roll, but the same as that in which the cartons travel on the carrier 33. The weight of the coating rolls and frame is balanced about the trunnions by a lever 139 projecting to the right in Fig. 1 and carrying an adjustable weight 140. The short arm of the same lever projecting to the left of the trunnions in that figure has a slot (seen best in Fig. 1), adapted to receive a horizontal pin on which the top end of the vertical connecting rod 144 is pivoted. This rod is extensible lengthwise, at top and bottom as indicated at 145, thus affording means to adjust the travel of the frame carrying the coating rolls, as it swings about trunnions 132. The lower end of this connecting rod is pivoted at 147 to a lever 148 extending across the machine (Fig. 4), fulcrumed at 149 on a bracket 150 of the main frame, the other end of this lever having a roll 151 where it bears on cam 153 on cam shaft 44. The cam 153, acting through its connections, swings the coating rolls 111 up to the surface of glue roll 117 and then returns them to such a position that they transfer the glue thus spread on them to the side flaps 108, 109, of the carton when these flaps pass from position B to position C. Small lateral shafts 154 (Fig. 4), running transversely and arranged one on each side of the machine, in arms 156 from the brackets 113, are capable of adjustment in the longitudinal direction of the machine in slots 160 (Fig. 3) in those arms. These shafts carry a series of separated small rolls 161 (Fig. 4), which are preferably in the nature of a series of disks, to reduce the danger of smearing the glue. These are idlers revolved by contact of the under surfaces of the flaps 108, 109, and holding the flaps firmly up against the coating rolls.

After passing the coating rolls the forward edges of the carton flaps 108, 109, strike the curved plates 162 which are fast on upper guide rails 164 which are provided to perform a function somewhat like the lower guide rails 76, holding the top portion of the carton firmly against lateral displacement. These plates 162 are so shaped as to bend the carton flaps upward to the vertical position indicated at position C. The glue here has a brief period for soaking into the flaps, or becoming tempered, while the carton is at rest and then as the carton moves forward to the position D the flaps are bent together and are sealed by mechanism shown most specifically in Figs. 5 and 7. This mechanism is carried on brackets 166, which depend from the upper frame 80 on each side of the line of travel of the cartons, and comprises transversely-operating rollers and fingers for depressing the flap on one side of the carton, holding it down temporarily and depressing the flap on the other side, and then pressing them both to make the glue adhere. Referring particularly to Fig. 7 the supporting bracket seen at 166 has bearings 167 in which a guide rod 169 is slidable endwise, thus moving a carrier frame 170 to and fro. A fixed parallel rod 171 guiding a yoke 172 projecting fixedly from 169 insures horizontal stability of the carrier frame 170. The carrier frame has vertically set sleeves 174, from the lower end of which project short rods or stems 178 carrying bearings 177 for a roller 179, set horizontally and adapted to travel over the horizontal surfaces on angle plates 182 that are riveted or otherwise fastened to the upper guide rails 164, substantially at a level with the top of the carton. Within the sleeves 174 pins 180 (Fig. 5) rise from stems 178, of smaller diameter, so that a spring 176 may be strung thereon, pressing the roller bearings downward, the springs themselves bearing at the top against adjusting nuts 181 which may be screwed up or down inside the sleeves 174 and through which nuts the pin 180 passes with a place for a cotter-pin or other device at the top to prevent the under parts from dropping out. By adjusting these nuts the elevation of the rollers 179 is varied; while springs 176 allow these rollers some vertical play. In operation the rolls 179 travel transversely across the top of the carton at the position D, bending down the glue coated flaps 108, 109, from their vertical position. Fingers 183 coöperate with these rollers, being screwed into frame 170 to a distance adjustable by the screw thread 184 and the check nut thereon, the operative end of these fingers being bent downward to positions in front of the roll and just above its operating level. The rolls 179 and fingers are arranged toward the middle of the machine, and when they are symmetrically at rest one is on each angle plate 182, with the fingers between the two rolls, and with the guide rods 169 projecting thence toward the sides of the machine. Consequently the upstanding carton flaps 108, 109, may enter between these rolls; and when the rolls travel to and fro transversely of the machine, the work that has been done by that one of them which is receding is held down by the fingers 183 which closely follow it. The edge of the carton flap is thus kept in such position that the other roll, which is then approaching will ride over it. This transverse motion of the rollers is effectuated by means of bell-cranks 187 pivoted on the upper frame 80. The end of one of these bell crank arms is seen in Fig. 7 with the slot 191 in which is engaged a pin roller 192 carried by a yoke fast to rod 169, and sliding on rod 171, so that the swinging to and fro of the bell crank causes the rod 169 and rollers 179 to move to and fro transversely of the machine. The other arm of each bell crank 187 is connected through a rod 196, adjustable in length, with an arm 200 of a bell crank on the lower frame of the machine, there being a series of holes so that the pivotal connection 198 may be made to the bell crank 187 at various distances from the fulcrum of the bell crank, in order to provide a variation in the throw of the rolls 179, for action on cartons of different widths. The lower bell cranks are pivoted on a bracket projecting from the frame 20 at 202 and have their other arms 204 drawn by springs 206 toward the frame 20; and the arm 204 which is on the cam shaft side of the machine has a roller 208 operated by cam 213 on cam shaft 44. The bell crank arm 204 on the other side of the machine is connected by rod 211 with a roller 212 which bears on the adjacent cam 209, this connecting rod being supported by a link 215 pivoted at one end to it and at its other end to the frame. The cams 209, 213, are set so as to give reciprocating motion to the rolls 179, one roll succeeding the other over the carton flaps. After this, and while the carton is still in the position D, the foot 217 swings down to the position shown in dotted lines in Fig. 5, where it presses on the closed top of the carton, thus holding the carton flaps 108, 109, firmly until the carton moves forward to the next stage. As slight variations occur in the height of cartons which are nominally of equal height, this foot 217 is made somewhat yielding; one suitable construction being shown in Fig. 5 in which the foot consists of a thin strip of metal attached to one end 219 of a lever fixed to a fulcrum shaft 220 having bearings in the frame 80. The foot 217 is of such shape that as the lever moves through its arc of travel the under surface of the foot tends to press on the full length of the top of the carton from front to back, thus avoiding sliding over the top. The other arm of the lever is marked 221 and is located at the side of the machine where it is fixed to the shaft 220. It is operated by a rod 223 connected to it at 222, whose other end is pivoted at 224 (Figs. 2 and 3) to a central portion of a lever 225, one of whose ends is pivoted at 226 on frame 20 and the other of whose ends carries roll 228 operated by cam 229 and spring 231, which being fastened to the frame 20 opposes the action of the cam. This cam, therefore, turns the foot 217 downward to press the carton, and the spring lifts it to its inactive position. While the foot is still held down in its pressing position, the carton carrier 33 moves the carton forward another stage to a position in front of the unloading pusher 96, Figs. 2, 13, which is so timed as to push the carton immediately from the carrier 33 and to the receiving table 94, where it enters under the first unit of the flexible sealing press 95.

The flexible press is illustrated in detail in Figs. 5, 6 and 8. It is composed of the supporting table 94 and a series of pressure units, coöperating with it and sustained by the upper frame 80, to press the cartons down upon the table 94. Each unit as illustrated consists of a weight $95^a$ whose under side is grooved or recessed to receive rolls $95^b$ adapted to turn on pintles $95^c$ which have bearings in the end portions of the weight $95^a$ as seen in Figs. 1 and 5. Each unit contains several of these rolls $95^b$. As represented in the drawing there are four in each unit and these are just sufficient to cover the top of the carton 10. In the action of this part of the apparatus it is preferable that the throw of the pusher 96 be just enough to move the carton from one unit to the next, so that at each pause in the movement, each carton is under one of the weights $95^a$. When no carton is present these weights, as seen clearly in Fig. 5, rest on lips on the frame 232, being thus suspended above table 94 at the level of the upper mechanism of the machine when no carton happens to be present. They are, however, free to move upward for a short distance whenever a carton is pushed under them. This is shown most plainly in Fig. 8 where the cartons 10 are to be considered as being all of nominally the same height, but in fact differing a little. Nevertheless owing to this feature of the invention the carton at E receives as much pressure as do F and G; and the longer ones receive no more pressure than the shorter. As the cartons are pushed along, the units adjust themselves upon the carton tops according to the elevation of the top. Each carton moved by the pusher 96 pushes each of those in line ahead of it under the next unit of the flexible press. Thus the sealed tops of the cartons are kept continuously under pressure for a considerable time after being sealed; and this pressure is uniform regardless of variations in their actual height, and is automatically adjusted according to the height, and continues for some length of time, depending on the length of series 95 and the speed of the machine. To make the machine of more universal adaptability to sizes of cartons differing in width, the weight units $95^a$ may be made narrower. To adapt it to cartons of considerably different height provision is made for changing the elevation of the frame 232, similar to the bell crank 83 mechanism already described for the main upper frame 80. This is clearly seen in Fig. 2 where 233 is a shaft to which a crank may be attached, turning a worm 234, thus turning a gear 235 on shaft 236 by which the bell cranks 237 may be adjusted. These are connected to each other by the shafts 236 and the horizontal rods 238, and carry the frame 232 suspended by links 240.

While the press mechanism thus described is shown as an integral part of the machine, supported by brace 242, it may be desirable for some purposes to make this a separate table, removable from the rest of the machine; and it will be apparent that this can readily be done, enabling a different press to be substituted.

It will be noted that the cartons are spaced apart while passing through the closing and sealing mechanisms, and that the carriers 33 are spaced correspondingly in order to hold them thus; but that in going through the continuous press the cartons are condensed. This condensation permits the continuous pressing to be applied to each carton in much less space than would otherwise be required, and it is attained conveniently by arranging the line of cartons that are being pressed at an angle to the line of cartons going through the folding and sealing mechanisms. Thus the cartons are subjected progressively to constant pressure while the glue is setting without the disturbances that would accompany their traveling on the carrier, and with other advantages.

By reason of its worm and gear control, no amount of pressure on the upper frame is effective to move it, either upward or downward, the adjustment of the bell cranks being possible only from the worm end and not from the reverse end.

While the preferred form of the machine embodying the invention has been illustrated and is adjustable in many respects to suit different requirements of work, it will be obvious that many variations may be made of the specific mechanism illustrated without departing from the scope of the invention as defined in the following claims.

What I claim is:

1. The combination of a frame and a series of mechanisms held thereby for operating on carton tops; a carrier operating horizontally under said mechanisms, coöperating therewith, and adapted to convey cartons to them in succession; and means to fix the frame at various elevations above the carrier; with extensible power transmitting rods connecting the mechanism of the carrier with that of said frame.

2. The combination of two frames one over the other; means to vary their distances apart; a carrier for cartons on the lower frame; a series of mechanisms on the upper frame operating on the tops of such cartons; and side rails fixed on the upper frame at variable distances apart, beside the path of cartons, whereby the tops of the moving cartons are closely confined laterally.

3. The combination of two frames one over the other; means to vary their distances apart; a carrier for cartons on the lower frame; a series of mechanisms on the upper frame operating on the tops of such cartons; and fixed side rails, variable in position on the upper frame, beside the path of cartons, whereby the tops of the moving cartons are closely confined laterally, and means whereby the height of an individual carrier may be varied to approximate in elevation the various positions of the mechanisms on the upper frame, whereby the tops of the cartons are propelled through said mechanisms by force applied substantially horizontally.

4. The combination of mechanisms for operating on cartons; a carrier coöperating therewith; separate frames supporting respectively said mechanisms and said carrier; guides on the one frame projecting perpendicularly to the line of said carrier and engaging the other frame; and bell cranks pivoted at a fixed distance from the carrier; links connecting one arm of each bell crank with the frame supporting said mechanisms; and links joining together the remaining arms of the several bell cranks, whereby all work in unison to vary the distance of said frames apart.

5. The combination of mechanisms for operating on cartons: a carrier coöperating therewith; separate frames supporting respectively said mechanisms and said carrier; bell cranks pivoted at a fixed distance from the carrier; links connecting one arm of each bell crank with the frame supporting said mechanisms; links joining together the remaining arms of the several bell cranks, whereby all work in unison to vary the distance of said frames apart; and irreversible gearing controlling the turning of the bell cranks.

6. The combination of mechanisms for operating on cartons; a carrier coöperating therewith; separate frames supporting respectively said mechanisms and said carrier; bell cranks pivoted at a fixed distance from the carrier; links connecting one arm of each bell crank with the frame supporting said mechanisms; links joining together the remaining arms of the several bell cranks, whereby all work in unison to vary the distance of said frames apart; a gear attached to one of the bell cranks, and a worm actuating said gear, whereby the cranks may be turned by force applied to the worm but not by force applied to the frame they support.

7. In combination, mechanisms for operating on cartons; a carton carrier coöperating therewith; separate frames supporting respectively said mechanisms and said carrier; standards on the one frame projecting in a direction perpendicular to the line of said carrier through eye holes on the other frame; hangers on the tops of said standards supporting said other frame; and means to elevate and depress said hangers simultaneously and uniformly, to fix the operating position of said mechanisms at different distances from said carrier.

8. In combination, two frames one over the other; a carrier for cartons on the lower frame, operating horizontally; mechanisms on the upper frame operating on the tops of cartons so carried; standards rising vertically from the lower frame; and bell cranks, supported on the standards and linked to each other and to said upper frame, whereby the elevation of said mechanisms may be shifted without changing their relation of parallelism to the carrier.

9. In combination, mechanism for operating on cartons; a carrier for cartons, coöperating therewith; separate frames supporting respectively said mechanisms and said carrier, and means to vary the distance between the two frames; extensible reciprocating rods, operating said mechanisms; and means on the carrier frame for driving the carrier and reciprocating said rods.

10. In combination, mechanisms for operating on cartons; a carrier for cartons, coöperating therewith; separate frames supporting respectively said mechanisms and said carrier, the one being mounted movably on the other and adjustable to different distances therefrom; mechanism on the carrier frame for receiving power and operating the carrier; a cam shaft on the same frame, and extensible rods transmitting power therefrom to the mechanisms on the other frame.

11. A flexible press for cartons comprising means adapted to support a line of cartons, combined with a flexible pressure element extending above and substantially parallel with said means, said pressure element comprising a series of relatively small rollers arranged side by side and adapted, independently of each other, to ride over the tops of the cartons, and a series of removable weights resting on said rollers; each weight being adapted to rest upon a number of the said rollers corresponding to the length of a carton, whereby the said element is flexible in sections which may be varied for cartons of different length by using weights resting on a corresponding number of said rollers.

12. The combination of mechanisms for operating on cartons; a carrier and a press coöperating therewith, the course of the cartons being through the carrier and thence through the press; separate frames respectively supporting the cartons, the mechanisms for operating thereon, and the upper member of the press; means for adjusting the elevation of said frame-supporting mechanism with respect to the carton-supporting means; and means separate therefrom for adjusting the elevation of said upper member of the press.

13. Mechanism for operating on cartons comprising a support for a line of cartons, combined with a composite pressure member consisting of individual weights, adjacent to and independent of each other as to elevation; friction eliminating means, depressed by said weights upon the passing cartons; and supporting means affording a minimum elevation to said pressure member, said supporting means being itself adjustable in elevation with respect to the support on which the cartons rest.

14. Mechanism for operating on cartons comprising means adapted to support a line of cartons, combined with a line of non-rotatable weights above said supporting means and means intervening between said weights and the carton tops for eliminating friction, the whole constituting a flexible press, adjacent portions of which are adapted to be spread apart to different degrees, whereby cartons that are in the line and vary slightly from each other in height may receive uniform pressure; means for pushing said line of cartons through said press in successive stages, the length of said stages and of said adjacent portions of the press conforming to the length of individual cartons in the line.

15. Mechanism for operating on cartons comprising means adapted to support a line of cartons, combined with a flexible pressure element extending above and substantially parallel to said means, and rollers journaled on under surfaces of and pressed downward by said element; adjacent portions of said flexible element being adapted independently of each other to press down through the rollers upon the tops of cartons, whereby cartons simultaneously under the pressure element and varying slightly from each other in height receive uniform pressure.

16. Mechanism for operating on cartons comprising means adapted to support a line of cartons, combined with a line of non-rotatable weights above said supporting means and means intervening between said weights and the carton tops for eliminating friction, the whole constituting a flexible press, adjacent portions of which are adapted to be spread apart to different degrees, whereby cartons that are in the line and vary slightly from each other in height may receive uniform pressure.

17. Mechanism for operating on cartons comprising in combination means for holding a compact file of cartons, a frame above it adjustable in elevation according to the average height of the cartons, a multiplicity of pressure blocks supported by the frame adjacent to each other and each adapted to be lifted thence independently of the others by the cartons, and means on each block to distribute its pressure over the length of the carton lifting it.

18. Mechanism for operating on cartons comprising in combination, a table for supporting the cartons; a frame above it adjustable in elevation according to the average height of the cartons; and a multiplicity of pressure blocks set adjacent to and separate from each other, carried by the frame, and adapted to bear down on the carton tops, thereby applying uniform pressure to cartons of varying height; the under surfaces of said blocks comprising rollers, whereby a higher carton following a lower may force a block upward in order to enter under it.

19. Mechanism for operating on cartons comprising in combination, a table for supporting the cartons; a frame above it, adjustable in elevation according to the average height of the cartons; and a multiplicity of pressure blocks set adjacent to and separate from each other, carried by the frame, and adapted to bear down on the carton tops, thereby applying uniform pressure to cartons of varying height; said blocks being of a length in the direction of travel corresponding to the length of a carton; and a reciprocating pusher, adapted to force cartons along under the blocks, and having an effective travel in so moving the cartons corresponding to the same length.

20. The combination, in mechanism for closing the ends of cartons, of two rollers, one being adapted to rest on each side of the opposite and upward projecting flaps of the carton, with their axes parallel to said flaps; and means to oscillate said rollers successively over the carton end; fingers projecting beyond said rollers at about the level of their bottoms, whereby the depressed flap is held down by the fingers as the roller retreats.

21. The combination, in carton closing mechanism, of a guideway for carton tops; platforms beside the way at the average level of carton tops; rollers resting thereon with axes parallel to the way; said rollers being automatically pressed downward; and means to run said rollers successively from their platforms transversely upon the way and back again, thereby pressing with substantial uniformity cartons of varying height.

22. The combination, in mechanism for closing carton ends, of a guideway closely confining the carton ends laterally, the sides of said guideway being adjustable laterally to accommodate cartons of different width; oscillating rollers, one on each side of the guideway and adapted to travel transversely across it; and mechanism for moving said rollers including bell cranks and links, with means for attaching the links to the bell cranks with varying leverage, thereby varying the travel of said rollers across said way.

23. In combination, mechanism for closing carton ends; means to move a carton along a path through a fixed position; rollers on opposite sides of said position, sliding rods supporting them and extending laterally away from said position, and bearings therefor; and means to oscillate said rods, sliding them endwise in their bearings transversely across said path to carry said rollers successively over the carton position and back again, thereby pressing down side carton flaps, one over the other.

24. Mechanism for operating on cartons comprising a carrier for the cartons combined with folding mechanism for their top flaps; a glue reservoir; a roller dipping therein; a scraper having an edge spring pressed toward said dipping roller, and a screw restraining it, to control the glue carried on the roller; a distributing roller driven positively, with its surface moving in the same direction as the carton flaps and oppositely to the adjacent distributing roller surface, and means to move said distributing roller alternately between a position close to the dipping roller and a position for contact with passing carton flaps.

Signed by me at Jersey City, N. J., this tenth day of January, 1913.

EDWARD G. TREMAINE.

Witnesses:
F. M. PRICE,
CHAS. HALSTEAD.